United States Patent [19]
Tamura et al.

[11] 3,868,394
[45] Feb. 25, 1975

[54] METHOD OF PRODUCING HYDROCHLORIDE OF ASPARTIC ANHYDRIDE

[75] Inventors: Fumihide Tamura; Yoichi Ozawa; Asao Nakamura, all of Tokyo, Japan

[73] Assignee: Ajinomoto Co., Inc., Tokyo, Japan

[22] Filed: Feb. 1, 1971

[21] Appl. No.: 111,741

[30] Foreign Application Priority Data
Mar. 30, 1970 Japan.................................. 45-26699

[52] U.S. Cl........................................... 260/346.8 R
[51] Int. Cl............................................. C07c 57/02
[58] Field of Search ............................. 260/346.8 R

[56] References Cited
UNITED STATES PATENTS
3,462,460   8/1969   Kollonitsch...................... 260/345.9

FOREIGN PATENTS OR APPLICATIONS
1,158,723   7/1969   Great Britain

OTHER PUBLICATIONS

Hirschmann et al., Journal Amer. Chem. Soc., Vol. 93 (II), (1971), p. 2746–2747.

Erdmann, Chem. Berichte (1899), Vol. 32, p. 2159–2162.

Prat, Chem. Abstracts (1950), Vol. 44, 5843g.

Wagner and Zook, Synthetic Organic Chemistry, New York, John Wiley (1953), p. 558–559.

Derwent Belgium Patent Reports (1959), Vol. 56 A, p. A22.

*Primary Examiner*—Henry R. Jiles
*Assistant Examiner*—Bernard I. Dentz
*Attorney, Agent, or Firm*—Hans Berman

[57] ABSTRACT

The hydrochloride of aspartic anhydride is readily prepared by contacting aspartic acid with phosgene in an inert organic solvent.

4 Claims, No Drawings

METHOD OF PRODUCING HYDROCHLORIDE OF ASPARTIC ANHYDRIDE

The present invention relates to an improved method for producing the hydrochloride of aspartic anhydride.

The hydrochlorides of dicarboxylic amino acid anhydrides may be used as chemical intermediates for preparing various derivatives of aspartic acid such as peptide and ester derivatives (J.A.C.S., 85, 1839 (1963)). The hydrochloride of aspartic anhydride also improves the aroma of foods (Dutch published patent application No. 6,504,992). The salts of aspartic anhydride such as its hydrobromide and chlorosulfonate were prepared heretofore by contacting the amino acids with a dehydrating reagent in a strong acid medium such as trifluoroacetic acid which is handled with difficulty. (see British Pat. No. 1,096,845).

In the known method the salts of the aspartic anhydride formed are not isolated easily and are usually obtained as oily substances contaminated with strong acids used as a reaction medium. Thus, when such salts of aspartic anhydride are used as chemical intermediates, the strong acids which are contained in the salts may inhibit a peptide-forming reaction and amide-forming reaction. The known method can not be applied to the industrial production of the hydrochloride of aspartic anhydride.

It has now been found that aspartic acid can be readily dehydrated with phosgene in an inert organic solvent to yield the hydrochloride of aspartic anhydride almost quantitatively. The hydrochloride of aspartic anhydride formed according to this invention can be isolated easily in a pure state.

In accordance with the present invention, aspartic acid is contacted with phosgene in any organic solvent inert to the reactants and the product. Phosgene is employed in amounts of at least one mole, preferably 1.1 to 6 moles, per mole of aspartic acid. Thus, this invention does not require to use a strong acid as a reaction medium.

Suitable solvents for the method of this invention include, but are not limited to ethers such as ethyl ether, butyl ether, methyl propyl ether, methyl iso-propyl ether, anisol, tetrahydrofuran, tetrahydropyran and dioxane; halogenated hydrocarbons such as chloroform, dichloromethane, 1,2-dichloroethane, trichloroethylene, 1,1,2-trichloroethane and chlorobenzene; hydrocarbons such as cyclohexane, benzene, toluene; nitriles such as acetonitrile; esters such as methyl, ethyl and propyl esters of carboxylic acids, e.g., formic acid, acetic acid, propionic acid, butyric acid and benzoic acid. Among the above-mentioned solvents, cyclic ethers such as tetrahydrofuran and dioxane are especially effective for the purpose of this invention.

The dehydration reaction is usually carried out by bubbling phosgene into a solution or suspension of aspartic acid, preferably with stirring. The reaction may also be carried out by adding aspartic acid to a solution of phosgene, or by mixing a solution of phosgene with a solution or suspension of aspartic acid.

The reaction may proceed smoothly even at room temperature, but can be accelerated by heating the reaction mixture. A reaction temperature below 80°C, preferably between −20°C and 60°C, is normally selected.

The precipitated crystals of the hydrochloride of aspartic anhydride are recovered by filtration, centrifugation or decantation. If necessary, an additional crop of crystals can be obtained by evaporating the solvent of the mother liquor and then adding aliphatic ethers such as ethyl ether and petroleum ether or hydrocarbons such as hexane, pentane and iso-octane, to the residue.

The following Examples illustrate the present invention:

EXAMPLE 1

13.3 g L-Aspartic acid (0.1 mole) was suspended in 250 ml dioxane, and phosgene was introduced into the suspension with stirring at room temperature until the reaction mixture became clear. The mixture was concentrated in vacuo and the crystals precipitated were filtered and weighed 5.5 g. The mother liquor was concentrated and hexane was added to the residue. The additional crystals obtained weighed 9.0 g. Total yield: 14.5 g (96%).

The crystals were identified as pure L-aspartic anhydride hydrochloride by their infrared spectrum (Nujol mull) and NMR spectrum in deuterated water, and by elementary analysis.

|  | C | H | N | Cl (%) |
|---|---|---|---|---|
| Found: | 31.80 | 4.53 | 8.57 | 22.73 |
| Calc. for $C_4H_6O_3NCl$: | 31.78 | 3.97 | 9.27 | 23.17 |

The crystals were also identified by the following experiment:

1.0 g of the crystals was dissolved in 10 ml methanol and was allowed to stand for 1 hour. The resulting solution was diluted with deuterochloroform. It contained a large amount of α-methyl-L-aspartate and a small amount of the β-isomer, as determined by means of NMR spectroscopy.

EXAMPLE 2

13.3 g L-Aspartic acid (0.1 mole) was suspended in 300 ml tetrahydrofuran, and then phosgene was bubbled through the solution with stirring at room temperature for about 20 minutes until the reaction mixture became clear. The mixture was concentrated in vacuo and the crystals precipitated were filtered and weighed 6.6 g. The mother liquor was concentrated and then ethyl ether was added to the residue. The additional crystals weighed 8.0 g. Total yield: 14.6 g (96%).

The crystals were identified as L-aspartic anhydride hydrochloride in a manner similar to Example 1.

EXAMPLE 3

13.3 g L-Aspartic acid (0.1 mole) was suspended in 400 ml ethyl acetate, and then phosgene was bubbled through the suspension at 60°C for about 8 hours until the mixture became clear. The reaction mixture was concentrated and mixed with diethyl ether. The crystals precipitated were collected and weighed 6.1 g (40% yield).

The crystals were identified as L-aspartic anhydride hydrochloride as in Example 1.

EXAMPLE 4

13.3 g L-Aspartic acid (0.1 mole) was suspended in 300 ml acetonitrile, and then phosgene was bubbled through the suspension at a temperature of 30° to 40°C for about 3 hours until the mixture became clear. The resulting solution was concentrated, and pentane was added to the residue. The precipitated crystals of L-aspartic anhydride hydrochloride were filtered and weighed 9.4 g (62%).

What we claim is:

1. A method of preparing the hydrochloride of aspartic anhydride having the formula $C_4H_6NO_3Cl$ which comprises:
   a. suspending aspartic acid in an amount of a liquid organic solvent medium insufficient to dissolve said aspartic acid, said medium essentially consisting of an ether, a hydrocarbon, a chlorinated hydrocarbon, a nitrile, or an ester of a carboxylic acid;
   b. introducing phosgene into the suspension so formed at a temperature between room temperature and 60°C until a clear solution is formed;
   c. precipitating said hydrochloride in crystalline form from said solution; and
   d. separating the crystalline hydrochloride from said solution,
      1. said medium being inert to said aspartic acid, to said phosgene, and to said hydrochloride at said temperature, and being capable of dissolving said hydrochloride,
      2. said medium prior to said introducing being free of acids stronger than aspartic acid.

2. A method as set forth in claim 1, wherein said phosgene is introduced into said suspension by bubbling phosgene gas through the suspension.

3. A method as set forth in claim 1, wherein said temperature is at least 30°C.

4. A method as set forth in claim 1, wherein said organic solvent is dioxane or tetrahydrofuran.

* * * * *